United States Patent [19]

Ohsono et al.

[11] Patent Number: 4,787,493
[45] Date of Patent: Nov. 29, 1988

[54] AUTOMATIC CLUTCH ADJUSTER MECHANISM

[75] Inventors: Kohei Ohsono, Saitama; Yoshihiro Yoshida, Tokyo, both of Japan

[73] Assignee: Honda Giken Kogyo Kabushiki Kaisha, Tokyo, Japan

[21] Appl. No.: 11,777

[22] Filed: Feb. 6, 1987

[30] Foreign Application Priority Data

Feb. 7, 1986 [JP] Japan .................................. 61-025359

[51] Int. Cl.⁴ ............................................. F10D 13/75
[52] U.S. Cl. ................................ 192/70.25; 192/70.27; 192/111 A
[58] Field of Search .................... 192/70.25, 70.27, 98, 192/101, 110 R, 111 A; 188/71.8, 196 F, 196 D, 196 P

[56] References Cited

U.S. PATENT DOCUMENTS

| | | | |
|---|---|---|---|
| 1,742,805 | 1/1930 | Carhart | 192/70.27 |
| 3,339,683 | 9/1967 | Burnett | 188/196 P |
| 3,556,267 | 1/1971 | Hall | 188/196 P |
| 3,768,612 | 10/1973 | Gale | 192/111 A |
| 3,789,967 | 2/1974 | Dau et al. | 192/111 A |
| 3,871,500 | 3/1975 | Linn et al. | 192/111 A |

FOREIGN PATENT DOCUMENTS

| | | | |
|---|---|---|---|
| 698793 | 11/1979 | U.S.S.R. | 192/111 A |
| 2038439 | 7/1980 | United Kingdom | 192/111 A |

Primary Examiner—Rodney H. Bonck
Assistant Examiner—David A. Testardi
Attorney, Agent, or Firm—Lyon & Lyon

[57] ABSTRACT

A clutch having a centrifugal clutch mechanism coupled in series with a controlled clutch mechanism to provide automatic clutching for starting and controlled clutching for gear shifting. A clutch pressure plate is coupled with a clutch release member for actuating the clutch. The clutch further includes a lock plate which is positioned around the clutch release member to engage same when tilted. An actuator directs the clutch lock plate along the clutch release member and acts to twist the plate to engage the member for disengaging the clutch. A spring returns the plate and untwists it when the actuator is released to allow automatic adjustment.

8 Claims, 4 Drawing Sheets

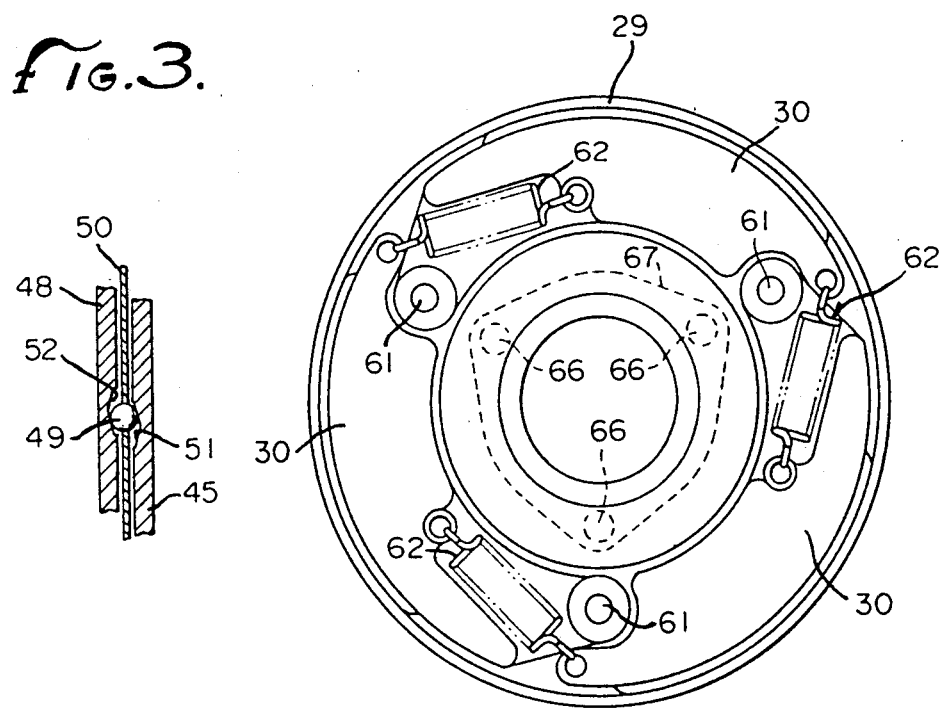
FIG.3.
FIG.4.
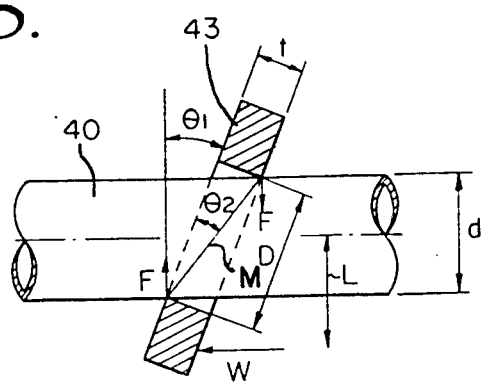
FIG.5.

AUTOMATIC CLUTCH ADJUSTER MECHANISM

FIELD OF THE INVENTION

The field of the present invention is clutch mechanisms.

BACKGROUND OF THE INVENTION

A wide variety of multiplate clutch mechanisms are known. Such mechanisms typically require a substantial throw to accommodate for wear and the like. Furthermore, such clutches typically require manual adjustment to accommodate for wear and the like. One such clutch is illustrated in FIG. 1.

The clutch of FIG. 1 is shown to be associated with the output shaft 1 of an engine. Power from the output shaft 1 is transmitted to a driven shaft 4 by means of a centrifugal clutch 2 and a controlled clutch 3. The centrifugal clutch 2 serves to transmit power from the output shaft to the controlled clutch 3 only when the speed of the engine exceeds a predetermined level. The controlled clutch 3 is controlled by a clutch lever 6 to alternately engage and disengage the clutch plates for changing gears and the like. Looking in some greater detail to the clutch of FIG. 1, the controlled clutch 3 is brought into a disengaged condition by actuating the clutch lever 6 angularly in a predetermined direction. An axially movable portion 7A of a clutch cam mechanism 7 is advanced toward the left, as seen in FIG. 1, through the action of cam balls 7B operating between the axially movable portion 7A and an axially nonmovable portion 7C. By moving the portion 7A to the left, a lifter body 8 operating as a clutch release member which is engaged with the movable portion 7A also moves to further drive to the left a clutch lifter 9, a bearing 10 and a pin 11. The movement of the pin 11 results in actuation of a pressure plate 12 which is also moved toward the left in FIG. 1 against the bias force of a clutch spring 13. The movement of the pressure plate 12 releases the pressure exerted between the pressure plate 12 and a clutch center 14 on clutch plates 15 and clutch discs 16. Through release of the pressure, the clutch 3 becomes disengaged.

To engage the clutch 3, clutch lever 6 is released so that it may move angularly to return to its initial position. This allows the axially movable portion 7A of the clutch cam to also return along with the intermediate elements to bring the pressure plate 12 back into position compressing the clutch plates 15 and discs 16 against the clutch center 14 under the influence of the clutch spring 13. The axially movable portion 7A is also returned under the influence of a spring 17 under compression between the axially movable portion 7A and the clutch lifter 9.

To accommodate for wear and thermal expansion of the materials on the faces of the clutch discs 16, this type of clutch provides a manually operative adjuster means 7D mounted to the exterior of the clutch housing. When sufficient wear, for example, occurs, the clutch no longer is completely engaged when the clutch lever 6 is fully released. Consequently, the adjuster 7D is employed to loosen a nut 7E for adjustment of the base 7F upon which the lifter body 8 is slidably positioned.

SUMMARY OF THE INVENTION

The present invention is directed to a clutch mechanism having the capability of automatic clutch adjustment. To this end, a lock plate is employed between an actuator and a clutch release member. The lock plate loosely fits on the clutch release member and is actuated by a protrusion on the actuator so as to engage and advance the clutch release member. Biasing means may be provided to return the lock plate fully with the actuator to insure proper linkage adjustment of a clutch mechanism.

Accordingly, it is an object of the present invention to provide a clutch mechanism having automatic adjustment capability. Other and further objects and advantages will appear hereinafter.

BRIEF DESCRIPTION OF THE DRAWINGS

FIG. 3 is a cross-sectional plan taken along line III—III of FIG. 2.

FIG. 4 is a cross-sectional view taken along line IV—IV of FIG. 2.

FIG. 5 is a detailed view of a lock plate on a clutch release member.

Identical reference characters are employed to denote similar elements throughout views 2 through 6.

DETAILED DESCRIPTION OF THE PREFERRED EMBODIMENTS

Figure 1:
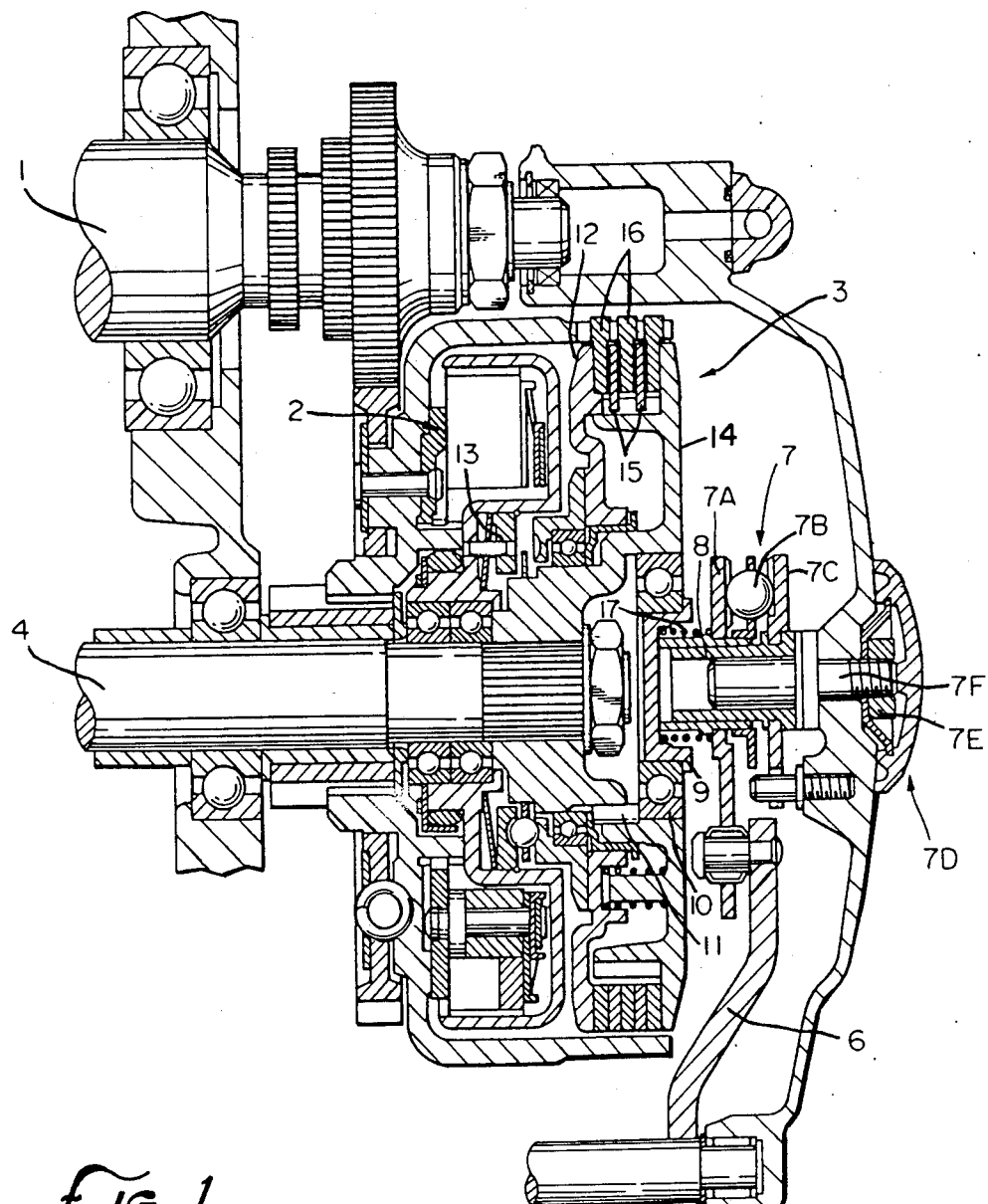
FIG. 1 is a cross-sectional elevation of a prior clutch mechanism.

A first clutch mechanism 20 is illustrated in FIGS. 2 through 5. The clutch 20 includes a centrifugal clutch 21 for starting. The centrifugal clutch 21 controls transmission of power from an engine responsive to engine speed. In series with the centrifugal clutch 21 is a controlled clutch 23 which is manipulated through a clutch lever 22. The controlled clutch 23 may be engaged to transmit power or disengaged to allow for changing of gears and the like. The centrifugal clutch 21 and the controlled clutch 23 are found to be mounted coaxially on a driven shaft 24. The controlled clutch 23 includes a clutch outer 25 rotatably mounted on the driven shaft 24. A clutch center 26 is mounted to and fixed to rotate with the driven shaft 24. A pressure plate 28 for pressing clutch discs 27A and clutch plates 27B is interposed between the clutch center 26 and the clutch outer 25. The pressure plate causes the discs 27A and clutch plates 27B to be held together such that the clutch center 26 and the clutch outer 25 rotate together.

The centrifugal clutch 21 includes a sub-clutch outer 29 which is interposed between the clutch outer 25 and the pressure plate 28. The sub-clutch outer 29 is rotatably mounted on the driven shaft 24. Clutch shoes 30 are pivotally mounted on the clutch outer 25 such that they may be urged against the sub-clutch outer 29 upon sufficient rotation of the clutch outer 25. A cam mechanism 31 is mounted between the sub-clutch outer 29 and the pressure plate 28 for urging the pressure plate 28 toward the clutch center 26 in response to a difference in rotation between the pressure plate 28 and the sub-clutch outer 29.

Looking in greater detail to the elements of the clutching mechanisms, the clutch outer 25 is of a cylindrical construction having a closed end. It is mounted on the driven shaft 24 through a collar 32 such that it is angularly movable thereon. A driven gear 33 is mounted on one side of the clutch outer 25 through a damper coil spring 34. The driven gear 33 is meshed with a drive gear 36 mounting on an output shaft 35 from the engine. The output shaft 35 is disposed parallel to the driven shaft 24 such that the driven gear 33 provides input power to the clutch outer.

The clutch center 26 is mounted on the driven shaft 24 for rotation therewith through splines 37 formed on the outer periphery of the driven shaft 24. The clutch center 26 is positioned within the clutch outer 25 such that the periphery of the clutch center 26 extends to adjacent the inner periphery of the clutch outer 25 at the open end of the clutch outer 25.

The clutch discs 27A include peripheral projections which extend to receiving grooves formed in the clutch center 25. In this way, the clutch discs 27A rotate with the clutch outer 25 and are able to move axially relative to the clutch outer 25. The clutch plates 27B include inner projections which extend to corresponding grooves in the clutch center 26 such that the clutch plates 27B and the clutch center 26 rotate together with some possible axial movement of the plates 27B relative to the clutch center 26. The clutch discs 27A and the clutch plates 27B are stacked in alternating fashion such that they form a controllable coupling between the clutch outer 25 and the clutch center 26.

A shaft 38 extends coaxially with the driven shaft 24 and is mounted to the housing of the clutch. Supported on the shaft 38 is a sleeve 39 for axial movement therealong. On the sleeve 39 is a clutch release member or lifter body 40 able to slide axially along the shaft 38. Lifter body 40 is engaged with a clutch lifter 41 such that the body 40 can move the lifter 41 to the left in FIG. 2. The lifter 41 in turn is engaged with a bearing 42. The bearing 42 is mounted in a coaxial central cavity of the clutch center 26 that is extended outwardly to the right in FIG. 2 from the driven shaft 24. The bearing 42 is able to move axially relative to the clutch center 26. Thus, the lifter body 40, supported on the shaft 38 is able to move along a first linear path defined by the shaft 38 toward and away from the driven shaft 24 and carrying the bearing 42 with it.

A lock plate 43 extends about the first linear path and is ring shaped to loosely fit on the lifter body 40. An actuator, generally designated 44, includes a cam mechanism for moving the lock plate 43 back and forth.

The actuator 44 includes an axially nonmovable plate 45 which is adapted to be rotated by the clutch lever 22. An axially movable plate 48 is coaxially arranged with the axially nonmovable plate 45 and is mounted on a tubular spacer 47 extending about the clutch release member 40 and the hub of the axially nonmovable plate 45. A plurality of cam balls 49, three being employed in the preferred embodiment, are interposed between the two plates 45 and 48 at equiangular locations thereabout. A spacer 50 forms a cage for the cam balls 49 to retain them in appropriate relative position.

Figure 2:
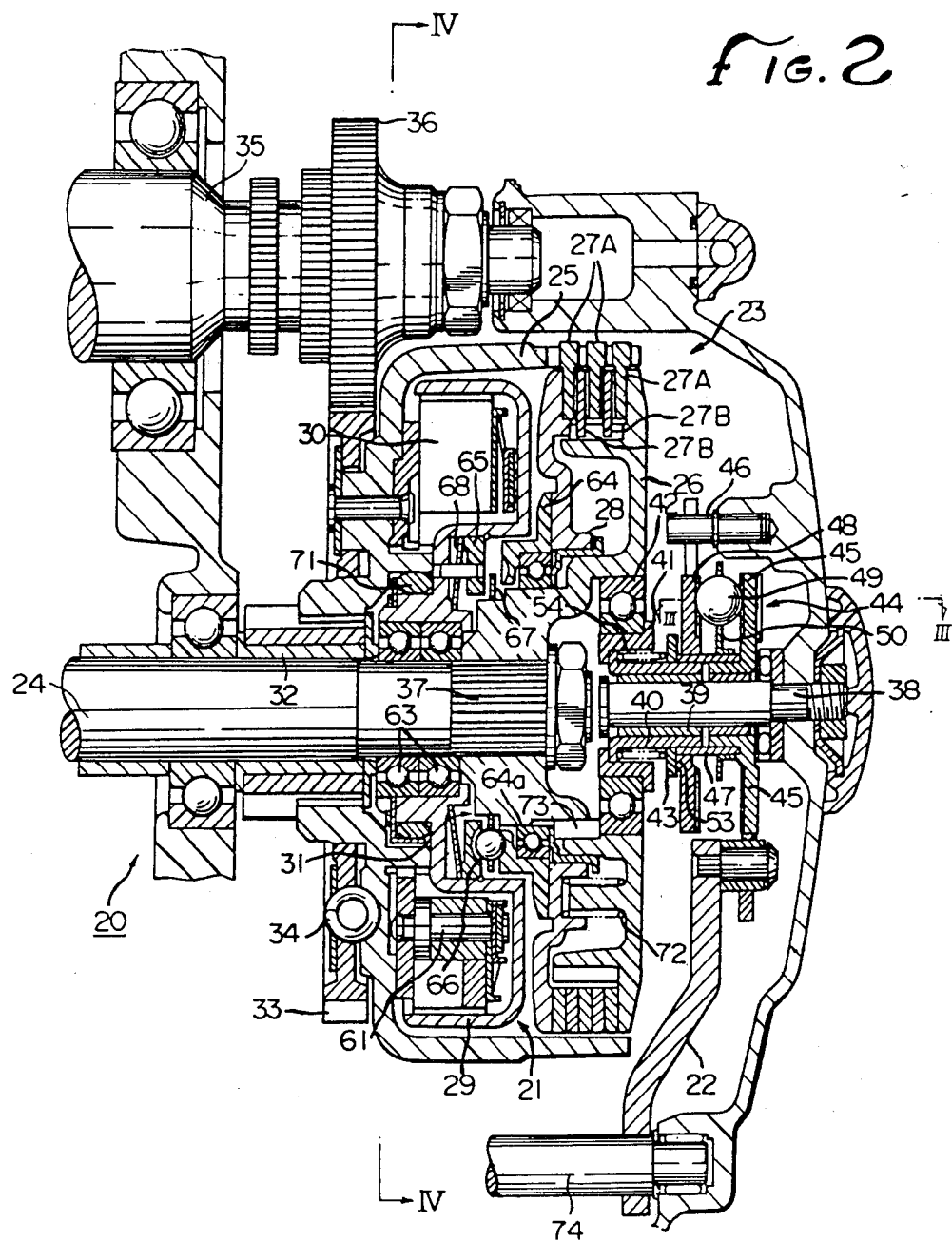
FIG. 2 a cross-sectional elevation of a clutch of the present invention.

As seen in FIGS. 2 and 3, a cam groove 51 is formed in the face of the nonmovable plate 45 which faces the movable plate 48. The groove 51 changes depth gradually in a circumferential direction. A corresponding cam groove 52 having the same shape is formed on the face of the movable plate 48 opposite to the cam groove 51. The cam balls 49 are received in the grooves 51 and 52 for rolling movement with relative rotation between the plates 45 and 48. When relative rotation between the plates 45 and 48 is experienced, the cam balls 49 roll to shallower portions of the cam grooves 51 and 52. This results in movement of the axially movable plate 48 away from the axially nonmovable plate 45. Consequently, the actuator 44 is effectively moved toward the lock plate 43 along the first linear path.

The actuator 44 incorporates a projection 53 on the face of the axially movable plate 48 which faces the lock plate 43. The projection is on one side of the clutch release member or lifter body 40 such that it is eccentrically positioned relative to the lock plate 43. When the axially movable plate 48 moves toward the pressure plate 28, the projection 53 tilts the lock plate 43 so that the lock plate 43 is firmly engaged with the lifter body 40. This result is achieved because of a wedging action of the loosely fitting lock plate 43 on the lifter body 40.

Means for resiliently biasing the lock plate 43 toward the actuator 44 is provided concentrically about the lifter body 40 by means of a spring 54. Because of the spring 54, the lock plate 43 is held against the spacer 47 when the clutch is engaged. The lock plate then comes back to a fixed position regardless of the amount of wear or the like affecting the engaged position of the pressure plate 28. Therefore, when the lock plate 43 is actuated, the mechanism is automatically adjusted and the amount of throw required for the pressure plate 28 remains fixed.

Turning in more detail to the centrifugal clutch 21, arcuate clutch shoes 30 are mounted on the inner side of the end of the clutch outer 25. Each of the clutch shoes 30 is pivotally supported adjacent one end thereof by a pin 61 which extends from the clutch outer 25. Each shoe 30 includes a return spring 62 which extends between the clutch shoe 30 intermediate the ends thereof and the clutch outer 25. The spring 62 biases the clutch shoe 30 to be pivoted toward the center of the clutch outer 25. A sub-clutch outer 29 is supported on the driven shaft 24 by means of a bearing 63 mounted on the driven shaft 24 to cooperate with the clutch shoes 30.

A cam mechanism 31 is mounted within the centrifugal clutch 21. The cam mechanism 31 employs the same construction as the actuator 44. The mechanism 31 comprises a first cam plate 64 disposed in abutting relation with the pressure plate 28 and facing the sub-clutch outer 29. A second cam plate 65 is mounted on the sub-clutch outer 29 so as to rotate therewith. A plurality of cam balls 66 is interposed between the two plates 64 and 65. A spacer 67 for holding the cam balls 66 in position relative to one another maintains the balls in equiangular orientation within the cam mechanism. A clutch spring 68 is positioned between the plate 65 and the sub-clutch outer 29 to urge the plate 65 toward the plate 64. Cam grooves are formed in the plates 64 and 65 as in the actuator mechanism 44. With relative rotation between the sub-clutch outer 29 and the pressure plate 28, the plates 64 and 65 are urged away from one another. The pressure plate 28 is thus urged by the clutch spring 68 toward the clutch center 26 by means of the cam plate 64. This results in the clutch discs 27A and the clutch plates 27B being pressed together to thereby engage the clutch outer 25 and the clutch center 26 together. The sub-clutch outer 29 serves this mechanism as a support therefor.

A one-way clutch 71 is provided between the clutch outer 25 and the sub-clutch outer 29 for disengaging the clutch outer 25 and the sub-clutch outer 29 when the clutch outer 25 is rotated faster than the sub-clutch outer 29. When the clutch outer 25 is not rotating faster than the sub-clutch outer 29, the one-way clutch connects the two members such that they rotate as one.

A preset spring 72 is provided between the clutch center 26 and the pressure plate 28 to urge them away from one another. In this way, the clutch will properly release under the appropriate conditions when the centrifugal clutch is not engaged. To move the pressure plate 28 to a disengaged position when controlled by the actuator 44, a lift pin 73 slidably extends through the clutch center 26. The pin 73 extends between the bearing 42 on the clutch lifter 41 and the cam plate 64. Thus, the lift pin transmits the operation of the clutch lifter 41 directly to the cam plate 64 through a bearing 64a.

Looking then to the operation of the clutch mechanism, when the engine is running, the rotation of the engine is transmitted to the clutch outer 25 by means of the output shaft 35. The output shaft 35 includes the drive gear 36 which in turn drives the driven gear 33. When the engine speed is below a predetermined level, such as at idle, the bias of the shoe return spring 62 is greater than the centrifugal force exerted on the clutch shoes 30. Consequently, the clutch shoes 30 are held away from the sub-clutch outer 29 and no power is transmitted to the sub-clutch outer 29.

When the sub-clutch outer 29 is stopped, relative rotation between the sub-clutch outer 29 and the pressure plate 28 does not exist. Therefore, the cam mechanism 31 does not produce any axial force urging the pressure plate 28 to engage the clutch outer 25 and clutch center 26. Consequently, without having to actuate the controlled clutch 23, it is disengaged.

When the engine speed increases beyond the predetermined level, for example during starting up of the vehicle, the centrifugal force acting on the clutch shoes 30 increases and overcomes the bias of the shoe return spring 62. The clutch shoes 30 then move outwardly to engage the sub-clutch outer 29 to couple the clutch outer 25 with the sub-clutch outer 29. The rotation of the sub-clutch outer 29 then results in relative rotation between the cam plate 64 and the cam plate 65. The cam balls 66 shift between the plates such that the plate 64 urges the pressure plate 28 to move toward the clutch center 26 as supported from the clutch spring 68. With movement of the pressure plate, the clutch discs 27A and the clutch plates 27B interposed between the clutch outer 25 and the clutch center 26 are pressed together to result in engagement of the clutch. Thus, with engine speed above a predetermined level, power is transmitted from the output shaft 35 through the clutch mechanism to the driven shaft 24. If further power output from the engine is experienced, the mechanism tends to increase the force urging the pressure plate 28 toward clutch engagement. If any relative rotation occurs between the plates 24 and 25, further cam action will increase the displacement of the mechanism 31 to create the additional force on the pressure plate 28.

The engagement above starting speeds of the engine may be selectively controlled by the control clutch 23. The operating rod 74 may be angularly moved so as to angularly move the plate 45 in a predetermined direction by means of the clutch lever 22. Relative rotation between the plate 45 and the plate 48 then occurs such that the cam balls 49 are moved into shallower portions of the cam grooves 51 and 52. The plate 48 is then moved toward the left as seen in FIG. 2. The projection 53 on the plate 48 urges the lock plate 43 to be tilted so that the lock plate 43 becomes firmly engaged with the lifter body 40.

With further movement of the operating rod 74, the plate 48 moves the lock plate now coupled with the lifter body 40 to the left. This in turn moves the clutch lifter 41, the bearing 42, the pin or pins 73, the bearing 64a and the cam plate 64. The pressure plate 28 then follows through the urging of the preset spring 72. As a result, the engagement between the clutch discs 27A and the clutch plates 27B is released to disengage the driven shaft 24 from the output shaft 35.

When the clutch lever 22 is returned to its original position, the cam balls 49 are again moved into the deep portion of the cam grooves 51 and 52. The pressure plate 28, the bearing 42, the clutch lifter 41, the lifter body 40 and so on are then returned to their original positions under the influence of the clutch spring 68. The lock plate 43 is also urged toward the right as seen in FIG. 2 against the left end of the spacer 47 under the influence of the return spring 54. The tilting of the lock plate 43 which had engaged the lock plate with the lifter body 40 is lessened such that the lifter body 40 is released.

Because of the sliding arrangement of the lock plate 43 relative to the lifter body 40 when the clutch actuator is released, the lock plate 43 is free to take up an appropriate starting position for disengagement of the clutch. This starting position is independent of the position of the lifter body 40 which is determined by the amount of wear and thermal expansion experienced by the clutch plates. By allowing the lock plate 43 to return to a set position independently of the location of the lifter body 40, the same amount of throw will continue to release the controlled clutch 23 without regard to the amount of wear and the like.

Looking more specifically to the relationship between the lock plate 43 and the lifter body 40, reference is made to FIG. 5. In FIG. 5, the following references are presented:

W . . . pressure which the projection 53 of the cam plate 48 applies to the lock plate 43.

L . . . the distance between the central axis of the lifter body 40 and the point at which the projection 53 applies pressure to the lock plate 43.

F . . . normal forces between the lock plate 43 and the lifter body 40.

$\theta_1$ . . . the angle made by the lock plate 43 with a perpendicular to the lifter body 40.

$\theta_2$ . . . the angle a line drawn between the points of application of the normal forces between the lock plate 43 and the lifter body 40 makes with a plane of the lock plate 43.

m . . . the distance between the points of application of the normal forces F.

From the foregoing, the relationship according to the moment distribution is as follows:

$$WL = Fm \sin(\theta_1 + \theta_2)$$

and, the following formula is obtained from the above formula:

$$W = Fm \sin(\theta_1 + \theta_2)/L$$

If the following formula is obtained when u (coefficient of friction) is introduced into this formula, $$Fu/W = uL/[m \sin(\theta_1 + \theta)] \geqq 1$$

then the lock plate 43 is firmly engaged with the lifter body 40.

The stroke of the movable plate 48 required for locking the lock plate 43 is determined by the values of D, d (the diameter of the lifter body 40), L and t (the thickness of the lock plate 43), and these values may be selected arbitrarily. Therefore, upon determining the values of D, d, L and t suitably, the stroke of the plate 48 required for tilting the lock plate 43 into firm engagement with the lifter body 40 can be determined.

Figure 6:
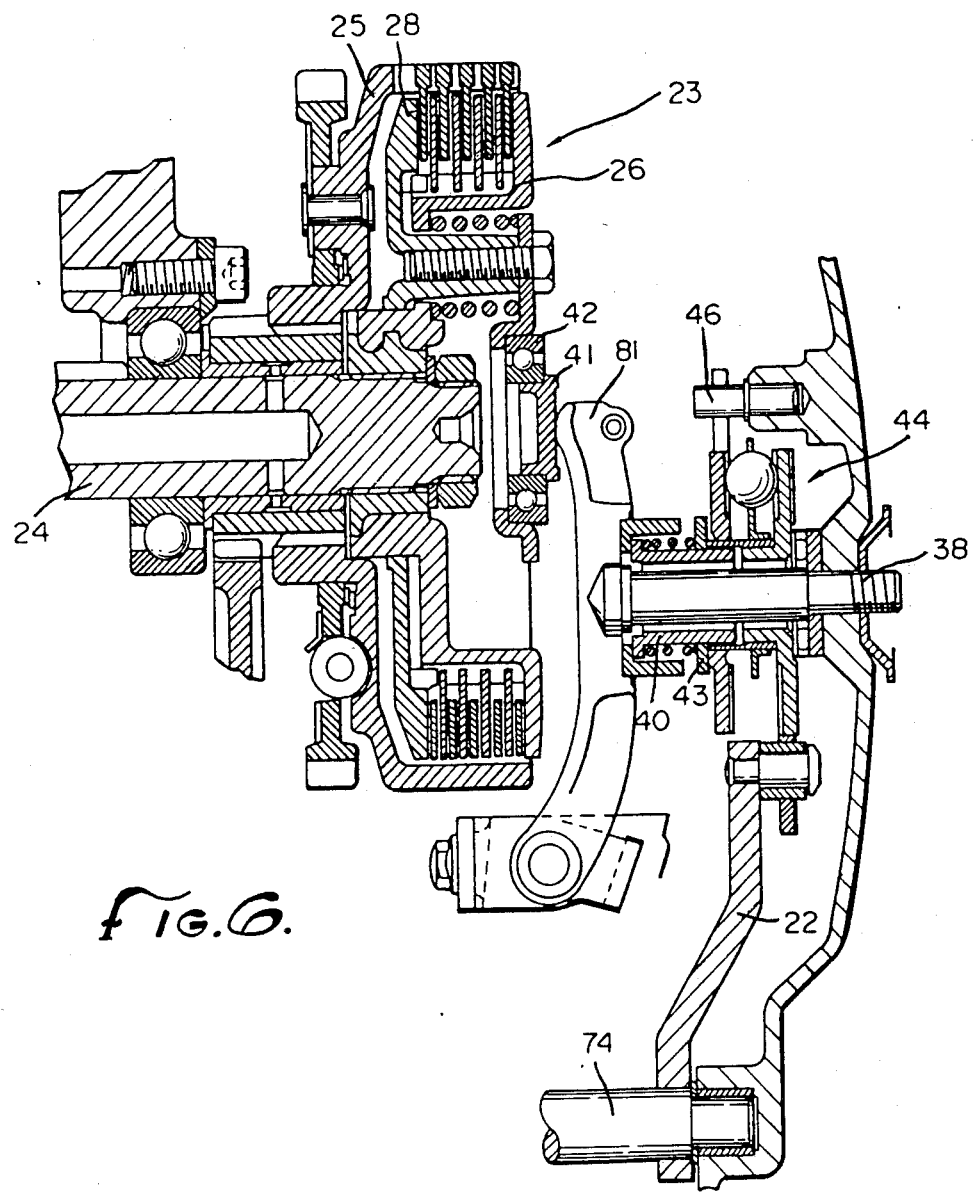
FIG. 6 is a cross-sectional elevation of a second embodiment of the present invention.

In the foregoing embodiment, although the shaft 38 supporting the cam mechanism is disposed coaxially with the output shaft 24, this is not necessary. For example, as shown in the second embodiment illustrated in FIG. 6, the shaft 38 supporting the cam mechanism may be disposed out of alignment with the output shaft 24. This is accomplished through the use of a lever 81 which is pivotally mounted at one end thereof.

As described above, the automatic clutch adjuster for the release mechanism of a clutch achieves the following advantageous effects:

(1) Even if the pressure plate is displaced out of position due to wear of the clutch discs, the position of engagement of the lock plate with the lifter body is automatically changed to compensate for the pressure plate displacement. Therefore, the amount of lift of the pressure plate remains constant.

(2) Since the clutch contains the built-in adjuster mechanism, there is no need for adjusting the clearance between the pressure plate and the clutch disc in the disengaged position of the clutch.

(3) Since the amount of lift of the pressure plate is stable, the clutch is positively brought into its disengaged condition. As a result, dragging of the clutch is prevented.

(4) There is no need to provide an additional amount of lift beyond that required to operate the pressure plate to accommodate for changes in the lift requirements as in the case for conventional devices. Therefore, the amount of lift of the pressure plate can be reduced and the clutch operating load can correspondingly be reduced.

Accordingly, an improved clutch mechanism is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A release mechanism for a clutch, comprising:
   a support shaft having an axis,
   a clutch release sleeve operatively connected to said clutch and concentrically disposed about said support shaft for axial movement therealong between a clutch-engaged position and a clutch-disengaged position,
   selectively movable actuator means for moving said sleeve along said shaft, and
   means for adjustably connecting said actuator means to said sleeve for concurrent movement along said shaft, including:
      a rigid annular lock plate normally biased into a position loosely encircling said sleeve,
      means on said actuator means for inclining said lock plate with respect to said support shaft axis into binding engagement with said sleeve as said actuator means moves through a first range of movement along said shaft from said clutch-engaged position and for concurrently moving said lock plate and said sleeve to release said clutch during a second range of movement along said shaft toward said clutch-disengaged position,
      means for moving said actuator means along said support shaft, and
      means for resiliently biasing said lock plate into said loosely-encircling condition each time said sleeve moves toward said clutch-engaged position.

2. The release mechanism of claim 1 in which said actuator means includes an annular plate encircling said support shaft and containing a bearing surface in facing relation to said lock plate, said bearing surface having means thereon to incline said lock plate into locked engagement with said sleeve when said bearing surface engages the facing surface of said lock plate.

3. The release mechanism of claim 2 wherein said clutch release sleeve is a hollow, cylindrical member coaxially disposed on said support shaft.

4. The release mechanism of claim 2 in which said lock-plate inclining means comprises an eccentrically positioned projection extending from one radial side of the bearing surface of said annular plate.

5. The release mechanism of claim 2 in which said actuator means includes an axially fixed plate spaced from said annular plate and cam means operative to move said annular plate axially of said support shaft upon relative rotational movement of said axially fixed plate.

6. The release mechanism of claim 1 in which said resilient biasing means biases said lock plate against said actuator means.

7. The release mechanism of claim 6 wherein said means for resiliently biasing said lock plate includes a coil spring concentrically disposed about said clutch release sleeve and imparting a biasing effect between said clutch release sleeve and said lock plate.

8. The release mechanism of claim 1 in which said support shaft is fixed.

* * * * *